(12) United States Patent
Bremer et al.

(10) Patent No.: US 11,681,930 B2
(45) Date of Patent: Jun. 20, 2023

(54) METHOD FOR CONFIGURING A MATCHING COMPONENT

(71) Applicant: International Business Machines Corporation, Armonk, NY (US)

(72) Inventors: Lars Bremer, Boeblingen (DE); Martin Oberhofer, Sindelfingen (DE); Benjamin Fabian Hogl, Eningen (DE); Mariya Chkalova, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 822 days.

(21) Appl. No.: 16/579,898

(22) Filed: Sep. 24, 2019

(65) Prior Publication Data

US 2020/0134483 A1     Apr. 30, 2020

(30) Foreign Application Priority Data

Oct. 31, 2018   (GB) ..................................... 1817789

(51) Int. Cl.
*G06N 5/04*        (2023.01)
*G06F 16/25*       (2019.01)
*G06N 20/00*       (2019.01)

(52) U.S. Cl.
CPC ............. *G06N 5/04* (2013.01); *G06F 16/254* (2019.01); *G06N 20/00* (2019.01)

(58) Field of Classification Search
CPC .................................................... G06F 16/254
See application file for complete search history.

(56) References Cited

U.S. PATENT DOCUMENTS

| 8,341,131 | B2 | 12/2012 | Cohen | |
| 8,364,682 | B1* | 1/2013 | Gershony | G06Q 30/02 |
| | | | | 707/739 |
| 9,600,602 | B2 | 3/2017 | Natarajan | |
| 2015/0067857 | A1* | 3/2015 | Symons | H04L 63/1408 |
| | | | | 726/23 |
| 2016/0021126 | A1* | 1/2016 | Vasseur | H04L 63/1416 |
| | | | | 726/23 |
| 2016/0092479 | A1 | 3/2016 | Kabra | |
| 2018/0137193 | A1 | 5/2018 | Kabra | |
| 2019/0129981 | A1* | 5/2019 | Haas | G06F 16/27 |

OTHER PUBLICATIONS

Bremer et al., "Method for Configuring a Matching Component", Application No. 1817789.9 filed Oct. 31, 2018, 44 pages.

(Continued)

*Primary Examiner* — Richard L Bowen
(74) *Attorney, Agent, or Firm* — Brian M. Restauro (57) ABSTRACT

The present disclosure relates to a method for enabling data integration. The method comprises collecting matching results of matching of records by a matching component over a time window. The number of false tasks of user defined tasks and system defined tasks in the collected matching results may be determined. The matching criterion used by the matching component may be adjusted to minimize the number of user defined tasks while the fraction of false tasks stays within a certain limit. The matching criterion may be replaced by the adjusted matching criterion for further usage of the matching component.

19 Claims, 4 Drawing Sheets

(56) References Cited

OTHER PUBLICATIONS

Chandramohan, Prashant, "De-Duplication Part 1: Deterministic Matching Approach", MDM—A Geeks Point Of View, May 21, 2014. 4 pages.
Dhaliwal, Ripudaman Singh, "Informatica MDM—Fuzzy Matching", Mastech Digital, Apr. 9, 2018, 3 pages.
"Understanding Suspect Duplicate Processing for Party Data", IBM Knowledge Center, Sep. 19, 2018, 3 pages, <https://www.ibm.com/support/knowledgecenter/en/SS2U2U_10.0.0/com>.

* cited by examiner

| collecting matching results of matching of records by the matching component over a predefined time window 301 |
|---|

↓

| determining the number of false tasks of user defined tasks and system defined tasks in the collected matching results 303 |
|---|

↓

| adjusting the criterion to minimize the number of user defined tasks while the fraction of false tasks stays within a certain predefined limit 305 |
|---|

↓

| replacing the matching criterion by the adjusted matching criterion for further usage of the matching component 307 |
|---|

METHOD FOR CONFIGURING A MATCHING COMPONENT

BACKGROUND

The present invention relates to the field of digital computer systems, and more specifically, to a method for enabling data integration.

Matching components such as the probabilistic matching components are configured to perform matching and comparison of data records. Based on the comparison results, decisions may be taken and tasks may be defined based on such decisions for processing the data records. Although, these components may detect duplicate records with high accuracy, they considerably rely on user inputs for making decisions.

SUMMARY

Various embodiments provide a method for enabling data integration, data integration system, and computer program product as described by the subject matter of the independent claims. Advantageous embodiments are described in the dependent claims. Embodiments of the present invention can be freely combined with each other if they are not mutually exclusive.

In one aspect, the invention relates to a method for enabling data integration. The method comprises:
providing a matching component for matching data records with a matching criterion, the matching component being configured for comparing data records and providing a level of matching between the compared data records, the matching component being configured in case the level of matching fulfils the matching criterion as a matching result to prompt a user for a user defined task for processing the data records and otherwise as a matching result to provide a system defined task for processing the data records, the processing comprising merging or keeping separate the compared records;
collecting matching results of matching of records by the matching component over a time window;
determining the number of false tasks of user defined tasks and system defined tasks in the collected matching results, a false task being a user or system defined task that is replaced by a user or system defined task;
adjusting the criterion to minimize the number of user defined tasks while the fraction of false tasks stays within a certain limit; and
replacing the matching criterion by the adjusted matching criterion for further usage of the matching component.

In another aspect, the invention relates to a data integration system configured for:
collecting matching results of matching of records by a matching component over a time window, the matching component being configured for matching data records with a matching criterion, the matching component being configured for comparing data records and providing a level of matching between the compared data records, the matching component being configured in case the level of matching fulfils the matching criterion as a matching result to prompt a user for a user defined task for processing the data records and otherwise as a matching result to provide a system defined task for processing the data records, the processing comprising merging or keeping separate the compared records;
determining the number of false tasks of user defined tasks and system defined tasks in the collected matching results, a false task being a user or system defined task that is replaced by a user or system defined task;
adjusting the criterion to minimize the number of user defined tasks while the fraction of false tasks stays within a certain limit; and
replacing the matching criterion by the adjusted matching criterion for further usage of the matching component.

In another aspect, the invention relates to a computer program product comprising a computer-readable storage medium having computer-readable program code embodied therewith, the computer-readable program code configured to implement all of steps of the method according to preceding embodiments.

BRIEF DESCRIPTION OF THE SEVERAL VIEWS OF THE DRAWINGS

In the following embodiments of the invention are explained in greater detail, by way of example only, making reference to the drawings in which.

DETAILED DESCRIPTION

The descriptions of the various embodiments of the present invention are being presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

A large fraction of records that have been processed by the matching component may be clerical records. Clerical records may be records for which the matching process of the matching component cannot definitively determine if the records are duplicate records or a non-matched record or if the records are matched records or non-matched records. Those clerical records need a user intervention for a closer look into the values of the records e.g. in order to define a user defined task. The present method may have the advantage of improving the process and performances of the matching component. The matching component may be configured in accordance with the present method without undue burden in order to reduce the number of clerical records to be processed in the data integration system. The present method may enable to achieve high quality matches in a practical amount of time.

The term "task" refers to an operation to be performed by the data integration system. The task may, for example, be one or more control instructions that are executable by the data integration system. The task may be a user defined task or system defined task. The system defined task may, for example, be automatically determined by the data integration system. The execution of the task on given records may, for example, result in merging the given records, keeping separate the given records, or splitting the given records if they are merged records.

The matching results may comprise an indication of defined tasks and respective records. A task of the matching results of the matching component may or may not have been executed. For example, the comparison of two records r1 and r2 at time t0 may result in a defined task A and the comparison of r1 and r2 at time t1 may result in task B which is different from task A. Task B may thus be used to replace task A in order to execute task B on the result of task A. The replacing of task A by task B is performed as follows. If task A has been executed resulting in a single record r1+r2, the execution of task B may split the records r1+r2. If task A has been executed resulting in separate records r1 and r2, the execution of task B may merge the records r1 and r2. If the task A is defined but not executed, the task B is executed on the compared records r1 and r2. Task B may be referred to as a reference task because task B has been defined at a point of time t1 later than t0 and/or the task B has been defined by a user (e.g. expert) and/or task B has been defined using an improved or updated version of the matching algorithm used for defining task A.

The time window during which the matching results are collected may be a predefined time window (e.g. user defined) or a configurable time window that may dynamically be defined e.g. depending on the size of matching results needed, the size of the time window may be chosen. The collection of matching results may result in a resolution history with contributions by system tasks (e.g. auto-resolution if a total matching score indicative of the level of matching is above an upper matching threshold of the matching criterion) and clerical tasks resolved by data stewards. The resolution refers to the task that has been defined for solving the question of whether the compared records are duplicates or not. The collection of the matching results may comprise defining tasks and saving data indicative of the defined tasks e.g. the collection may be performed while the matching component is running on records.

A data record or record is a collection of related data items such as a name, date of birth and class of a particular user. A record represents an entity, wherein an entity refers to a user, object, or concept about which information is stored in the record. The terms "data record" and "record" are interchangeably used. The data records may be stored in a graph database as entities with relationships, where each record may be assigned to a node or vertex of the graph with properties being attribute values such as name, date of birth etc. The data records may, in another example, be records of a relational database.

Matching of records comprises comparing attribute values of the records. Matched records (mergeable records) are records that represent the same entity. The level of matching of two records indicates the degree of similarity of the attribute values of the two records.

The merging of records is an operation which can be implemented in different ways. In a first example, the merging comprises creating a golden record as a replacement of the similar looking records which have been found to be duplicates to each other. This is known as data fusion or physical collapse with either record or attribute level survivorship. In this first example, the previous duplicate records which get a golden record replacement may be marked as inactive and all future updates are executed against the new golden record. In a second example, the merging of records comprises linking the records which have been identified as duplicates to a new entity record. However, the duplicate records themselves remain active and hence can be continued to be updated. If a read request comes in the second example, the entity is returned. However, if due to the updates on the underlying records for a particular record no match is found anymore, such a record gets unlinked. For both examples, the machine learning model may be configured to suggest the merging in accordance with the first example or in accordance with the second example.

Data integration involves combining data residing in one or more sources and providing users with a unified view of them. As part of the data integration, the data of the one or more sources may be harmonized and reconciled into a target system. The data integration may be used in different scenarios. Examples for these scenarios are: Multiple sources providing data to be integrated to a master data management (MDM) system. Multiple sources providing data to be integrated to a data warehouse system where master data resides as dimension tables in a star schema. And multiple sources for introduction of a new application package (e.g. SAP Netweaver ERP) where master data is the baseline for the new processes like order creation and fulfillment, billing, etc.

The term "user" refers to an entity e.g., an individual, a computer, or an application executing on a computer. The user may, for example, represent a group of users.

According to one embodiment, the fraction of the false tasks is the ratio of a weighted sum of the number of false tasks and the total number of user defined tasks and system defined tasks within the time window, wherein the weighted sum uses a first weight for a respective false user defined task and a different second weight for false system defined tasks.

For example, user defined tasks in the time window may be n tasks $ut_1, \ldots ut_n$, and the system defined tasks in the time window may be k tasks $st_1, \ldots st_k$. The false user defined tasks may, for example, be n1 tasks, $ut_1, ut_2 \ldots ut_{n1}$ and the false system defined tasks may be k1 tasks, $st_1 \ldots st_{k1}$. The weighted sum may be defined as follows $$\text{sum} = \sum_{i=1}^{n1} uw_i \cdot ut_i + \sum_{j=1}^{k1} sw_j \cdot st_j$$

where $uw_i$ is the first weight of the user defined task $ut_i$ and $sw_j$ is the second weights of the system defined task $st_j$. The fraction may be defined as the ratio sum/(n+k) of sum and the total number of tasks in the time window (n+k).

The first weights $uw_i$ (i=1, ... n1) may or may not be the same. The second weights $sw_j$ (j=1, ... k1) may or may not be the same.

The weights may, for example, be determined depending on values of an operating condition parameter. The operating condition parameter indicates the operation conditions of the matching component at the time a given task is defined. For example, the operating condition parameter may be a time at which a task is defined e.g. if a user task is defined during a non-working time period, the weight may be low because at that time period it is expected that the user inputs may not be accurate as in other time periods. In another example, the operating condition parameter may be the location at which the matching component is used e.g. if a task is defined in a production environment, it should impact the error rate more than a task defined in a development environment. In another example, the operating condition parameter may be defined by a user metric as described in the following embodiment.

By making use of weights defined on individual basis, this embodiment may enable an accurate quantification of the rate of errors.

According to one embodiment, the first weight is determined per false user defined task using a user metric. For example, for each false user defined task a respective weight may be determined taking into account a predefined user metric indicative of the user of the user defined task. According to one embodiment, the user metric indicates at least one of: the number of users defined a false user defined task; the number of user defined tasks in a time period, the tasks being defined by a user who defined a false user defined task in the time window or the total number of all completed user defined tasks (this indicates if the user is new or not); the number of correct user defined tasks in a time period, the tasks being defined by a user who defined a false user defined false task in the time window.

In other terms, the user metric may indicate whether a user was "new" at the moment of defining the user defined task. A user may be a "new" user based on how long he or she worked with the system e.g. if he/she worked less than a predefined period then he/she is a new user. Thus, if a false task is provided by the "new" user, such task should contribute less to the overall error rate. The user metric may further indicate steward or user performance. The user performance may be calculated for each individual user, indicating a share of false tasks, performed by the user over a certain time period. If the user performs generally well, then a wrong task, made by such user, should impact the error rate more than wrong decision of a poor-performing steward (that usually makes more false resolutions). The user metric may further enable multi-level approvals to increase the impact of false resolutions on the overall error rates for the tasks, that were closed after multi-level approval procedure that usually indicates critical tasks.

According to one embodiment, the second weight is equal to 1, and the first weight is smaller (lesser) or higher than 1 (>1 or <1). This may enable to set different weights for the system defined tasks and user defined tasks. For example, if the user who defined a user defined tasks is an expert of the data integration, the first weight is higher than one; otherwise the first weight is smaller (lesser) than one. This may enable a simplified control of the matching criterion of the matching components.

According to one embodiment, the method further comprises providing a split matching threshold and merge matching threshold, wherein the criterion requires that the level of matching is between the split and merge matching thresholds, wherein the adjusting comprises shifting the split and/or merge matching thresholds. For example, the range between the split matching threshold merge matching threshold may be controlled depending on the number of data stewards that can work on received records at the data integration system. The smaller the number of data stewards the smaller that range should be to avoid situations where clerical tasks (e.g. a clerical task may be an instruction or an information indicating to a user that he has to compare given clerical records in order to define a user defined task for merging them or keeping them separate) sit in the data integration system too long potentially causing business issues in credit risk assessment (no complete view of the real customer), order delivery (use of an outdated address since the correct one from a newer record has not been merged yet), etc. However, this might increase the number of false positives and false negatives which also might have negative business consequences. That's why a automation reduction of the clerical tasks without decreasing data quality is so critical.

In another example, the adjusting of the matching criterion may comprise adjusting features of the matching component. The adjusting of those features might be performed if the analysis of the errors which have been made can be attributed to certain features having too much or to less weight contribution to the overall matching decisions. Those features may for example be features of the matching algorithm used by the matching component such as the minimization method used for the matching. Other examples of features used for matching may be attributes data items related to name (title, salutation, first name, middle name and last name data items collectively would be the name feature for matching), address (street, house number, city, zip, country data items collectively would be the address feature for matching), date of birth could be another feature, identifiers such as social security number, etc. could be also features for matching. If for example a base feature weight is increased from 5 to 7 for the address feature and an upper threshold (e.g. a merge matching threshold as described herein) for auto-match (and hence auto-merge) is 15—more records will fall into the system area reducing the possibilities of human error (new data steward, etc.). auto-merge refers to the merging of records using a system defined task, wherein the execution of the merging and the definition of such system defined task may automatically be performed by the data integration system.

According to one embodiment, the adjusting of the criterion comprises: shifting the split and/or merge matching threshold such that a current interval formed by the shifted split and merge matching thresholds becomes smaller than a previous interval; and determining the fraction of the false tasks for the current interval; if the fraction of the false tasks is within the certain limit, repeating the shifting and the determining; otherwise using the current interval for the adjusted criterion. The certain limit may, for example, be a predefined limit e.g. user defined, or a configurable limit that may dynamically be adapted as described in the following embodiment.

According to one embodiment, the certain limit is any one of the following intervals [0, 0.001], [0, 0.01], [0, 0.1], [0, 0.0001] and [0, 0.00001]. In another example, the certain limit may dynamically be defined as follows. A threshold delta may be provided, e.g. delta=0.001, 0.01, 0.0001 or 0.00001. For each iteration i, the certain limit may be the interval [0, delta+$E_{i-1}$], wherein $E_{i-1}$ is the fraction of false tasks determined for the iteration i-1. This may enable an accurate method for optimizing the matching criterion and that converges quickly.

According to one embodiment, the false system defined tasks comprise false positive tasks and false negative tasks, wherein the false positive task is a task for merging the compared records, wherein the false negative task is a task for keeping separate the compared records. The user defined tasks may comprise false positive tasks and false negative tasks. For example, the false positive task is a task that was concluded or defined with a merge decision to merge records that was revoked later to keep that records separates. The false negative task is a task that was concluded to keep the records separate where at a later time this decision was reversed and the records were merged. Separating the false system defined tasks into false positive and false negative tasks may enable to determine the fraction of the false tasks more accurately by, for example, assigning different weights for the false positive tasks and false negative tasks. This may particularly be advantageous e.g. if a matching algorithm has an asymmetric performance in that it is more accurate to decide on merging tasks than it is for defining other tasks. For example, if the matching algorithm is more performant on deciding to merge records than on deciding to keep them separate, in this case, the false negative tasks may be assigned a higher weight, in the sum term of the fraction, than the false positive tasks.

According to one embodiment, the matching component is configured to use a probabilistic matching method for providing the level of matching. The matching component may be a probabilistic matching engine (PME). The PME engine may be configured to do matching with a matching criterion as follows. A PME defined level of matching resulting from a comparison of the received records by the PME is determined. A PME split matching threshold and PME merge matching threshold may be provided, wherein in case the PME defined level of matching is smaller than the PME split matching threshold the compared records may be kept separate, wherein in case the PME defined level of matching is higher than the PME merge matching threshold the compared records may be merged (e.g. in a single record), wherein in case the PME defined level of matching is between the PME split matching threshold and the PME merge matching threshold performing the inputting, receiving and processing. The data integration system may or may not comprise the PME engine.

This embodiment may seamlessly be integrated in existing systems.

According to one embodiment, the method further comprises assigning to each attribute of the compared records a predefined weight, wherein the PME level of matching is a combination of the individual levels of matching weighted by the respective weights of one or more attributes. This may further increase the accuracy of the matching process involved in the present method.

According to one embodiment, the matching component is configured for inputting the records to a predefined machine learning model; and receiving from the machine learning model an output indicative of the level of matching. The machine learning model may, for example, be obtained as described with reference to FIG. 7.

For example, the output of the machine learning model may comprise a classification (e.g. input records are mergeable or non-mergeable) of the received records in association with a confidence score of the classification. The level of matching may, for example, be indicated by at least the confidence score. For example, the higher the confidence score of a mergeable classification, the higher the level of matching between the compared records and vice versa. And, the higher the confidence score of a non-mergeable classification, the lower the level of matching between the received records and vice versa.

This embodiment may further increase the matching accuracy and further optimize the amount of time required for the achieving such accuracies.

The term "machine learning" refers to a computer algorithm used to extract useful information from training data by building probabilistic models (referred to as machine learning models) in an automated way. The machine learning may be performed using one or more learning algorithms such as linear regression, K-means, classification algorithms etc. A "model" may, for example, be an equation or set of rules that makes it possible to predict a category or to group input data it into clusters. The model is configured to provide a confidence score for each prediction it provides. The confidence score of a prediction may indicate the correctness of the prediction.

According to one embodiment, the method further comprises: receiving a training set indicative of compared records in association with a task indicative of whether the compared records are to be merged or not; training a predefined machine learning algorithm using the training set, thereby generating the machine learning model to predict if compared records are mergeable records.

For example, the training set may be retrieved from a task resolution history provided by the data integration system and/or other data integration systems. This history includes all matching decisions that data stewards have taken in the past. This includes the decision of the data steward (a match or non-match decision) as well as the attribute values of the two records that were compared. The matching decision is an indication of the user defined task. Using such a training set may provide an accurate prediction model.

According to one embodiment, the method further comprises generating the training set comprising collecting data from at least one training data source, and extracting from the collected data the compared records and associated tasks, wherein the training data source comprises the data integration system and/or one or more other data integration systems. For example, the extracting from the collected data comprises extracting attribute values of the compared records and an indication of the user or system defined task that has been performed for processing (e.g. merging or splitting) said compared records. The more training data sources of training data used, the more accurate the predictions of the generated models will be.

According to one embodiment, the method further comprises generating the training set comprising receiving a first set of one or more compared pairs of records and associated tasks; providing multiple non-compared pairs of records that are similar to the first set pairs of records; using the first set of records and non-compared records as the training set.

This embodiment may be advantageous in particular if no task resolution history exists. This embodiment may enable to generate the training set out of few compared records and associated tasks. This may save processing resources such as processing time that would otherwise be required for comparing data to be used for the training. This embodiment may enable a dynamic or active learning which may improve the quality of predictions of the machine learning model because up to date data is used for the predictions.

According to one embodiment, the multiple non-compared pairs of records are determined using a machine learning unsupervised algorithm based model. For example, an unsupervised learning algorithm may be trained to generate machine learning unsupervised algorithm based model for clustering data records based on their similarity. Among the resulting clusters of records, a cluster of record that is similar to a previously compared pair of records may be selected and thus included in the training set in association with the task defined for that compared pair of records.

According to one embodiment, the method further comprises updating the training set using the received records and data indicative of the processing performed. This may further increase the accuracy of the predictions performed by the generated models.

According to one embodiment, the output comprises at least a confidence score of the prediction by the machine learning model.

Figure 1:
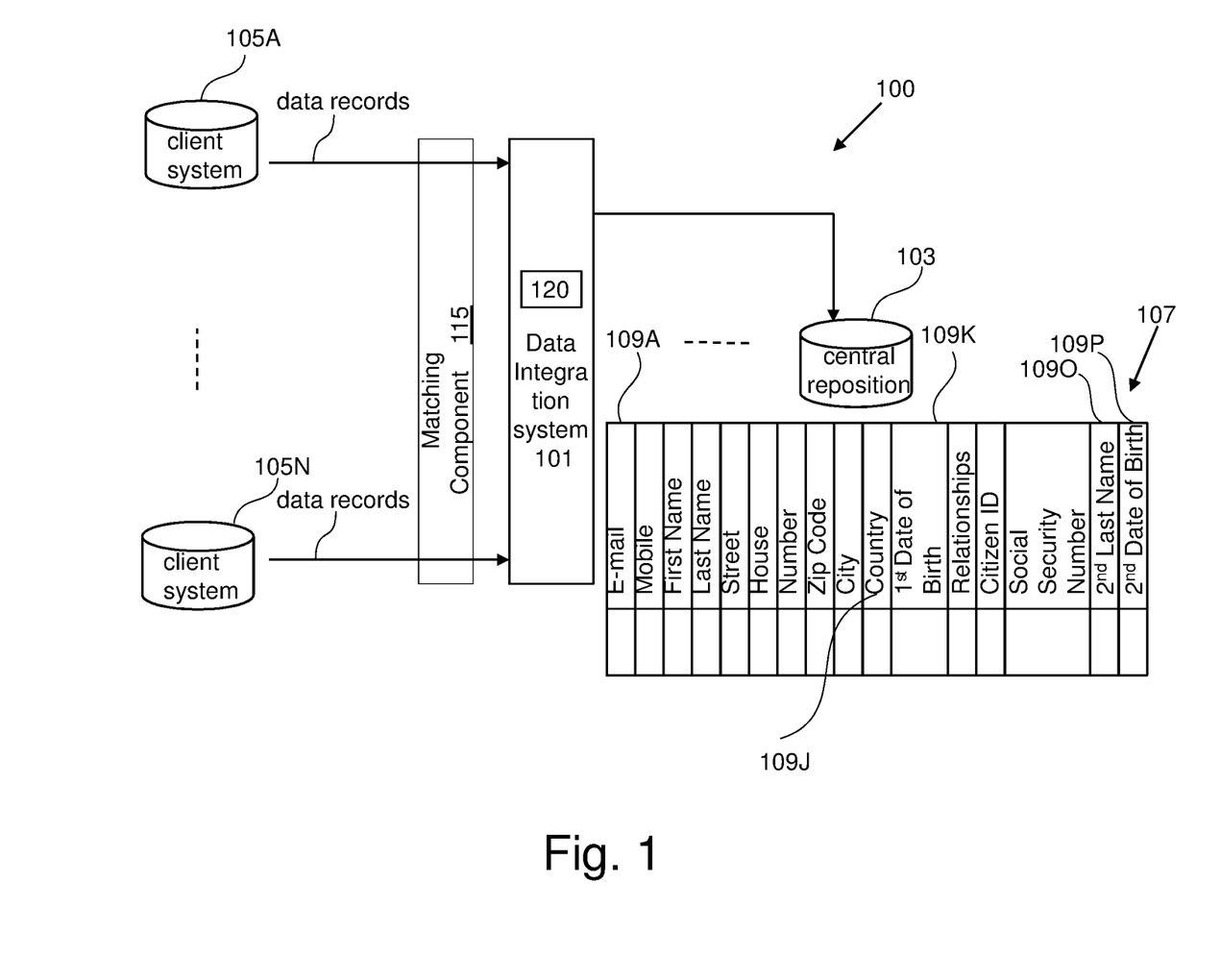
FIG. 1 depicts a block diagram representation of an exemplary master data management system.

FIG. 1 depicts an exemplary computer system 100. The computer system 100 may, for example, be configured to perform master data management and/or data warehousing. The computer system 100 comprises a data integration system 101 and one or more client systems or data sources 105A-N (collectively referred to as 105). The client system 105 may comprise a computer system (e.g. as described with reference to FIG. 6). The data integration system 101 may control access (read and write accesses etc.) to a central repository 103. The storage system may comprise the central repository 103.

Data integration system 101 may process records received from client systems 105 and store the data records into central repository 103. The client systems 105 may communicate with the data integration system 101 via a network connection which comprises, for example, a wireless local area network (WLAN) connection, WAN (Wide Area Network) connection LAN (Local Area Network) connection or a combination thereof.

The data records stored in the central repository 103 may have a predefined data structure 107 such as a data table with multiple columns and rows. The predefined data structure may comprise a set of attributes 109A-P (e.g. each attribute representing a column of the data table 107). In another example, the data records may be stored in a graph database as entities with relationships. The predefined data structure may comprise a graph structure where each record may be assigned to a node of the graph. Although the present example is described in terms of few attributes, more or less attributes may be used. The set of attributes 109A-P may, for example, be dynamically updated or determined while receiving data records e.g. if a received data record has a new attribute that is not part of set of attributes 109A-P, that new attribute may be added to the set of attributes 109A-P. In another example, the set of attributes 109A-P may be determined based on historical data indicating all attributes that are used by client systems 105.

For example, the client systems 105 may be configured to provide or create data records which may or may not have the same data structure 107. The attributes of each record received from the client systems 105 may be all the attributes 109A-P or part of the attributes 109A-P. For example, a client system 105 may be configured to provide records in XML or JSON format or other formats that enable to associate attributes and corresponding attribute values, wherein at least part of the attributes 109A-P are associated in the XML with respective values.

Each client system 105 may be configured to send the created data records to the data integration system 101 in order to be stored on the central repository 103 after being processed in accordance with an example method of the present disclosure. Before being processed, the received record may be transformed e.g. by the data integration system 101, into a format of the data structure 107.

In one example, data integration system 101 may import data records from a client system 105 using one or more Extract-Transform-Load (ETL) batch processes or via HyperText Transport Protocol ("HTTP") communication or via other types of data exchange. The data integration system 101 and/or client systems 105 may be associated with, for example, Personal Computers (PC), servers, and/or mobile devices.

Each data record received from client systems 105 by the data integration system 101 may or may not have all values of the set of attributes 109A-P e.g. a data record may have values of a subset of the set of attributes and may not have values for the remaining attributes. Once stored in the repository 103, the remaining attributes having no values may be maintained empty in one example. In other terms, the records provided by the client systems 105 have different completeness. The completeness is the ratio of number of attributes of a data record comprising data values to a total number of attributes in the set of attributes 109A-P.

The computer system 100 may further comprise a matching component (e.g., matching component 115 or matching engine). The matching component 115 is shown as a separate component of the data integration system 101. In another example, the matching component 115 may be part of the data integration system 101. The matching component 115 may be configured for matching data records received form the client system 105 with a matching criterion. The matching component 115 is configured for comparing data records and providing a level of matching between the compared data records. The matching component 115 is configured such that in case the level of matching fulfils the matching criterion to prompt a user for a user defined task for processing the data records. And in case the level of matching does not fulfil the matching criterion, the matching component is configured to provide a system defined task for processing the data records. The processing comprises merging or keeping separate the compared records. An example matching criterion of the matching component 115 is described with reference to FIG. 2.

The data integration system 101 may be configured to process the received records using one or more algorithms such as an algorithm 120 implementing at least part of the present method. In another example, the data integration system 101 may be configured to receive records in association with tasks and level of matchings that resulted from the comparison of those received records by the matching component 115. The algorithm 120 may be configured to adjust the matching criterion of the matching component in accordance with the present disclosure.

Figure 2:
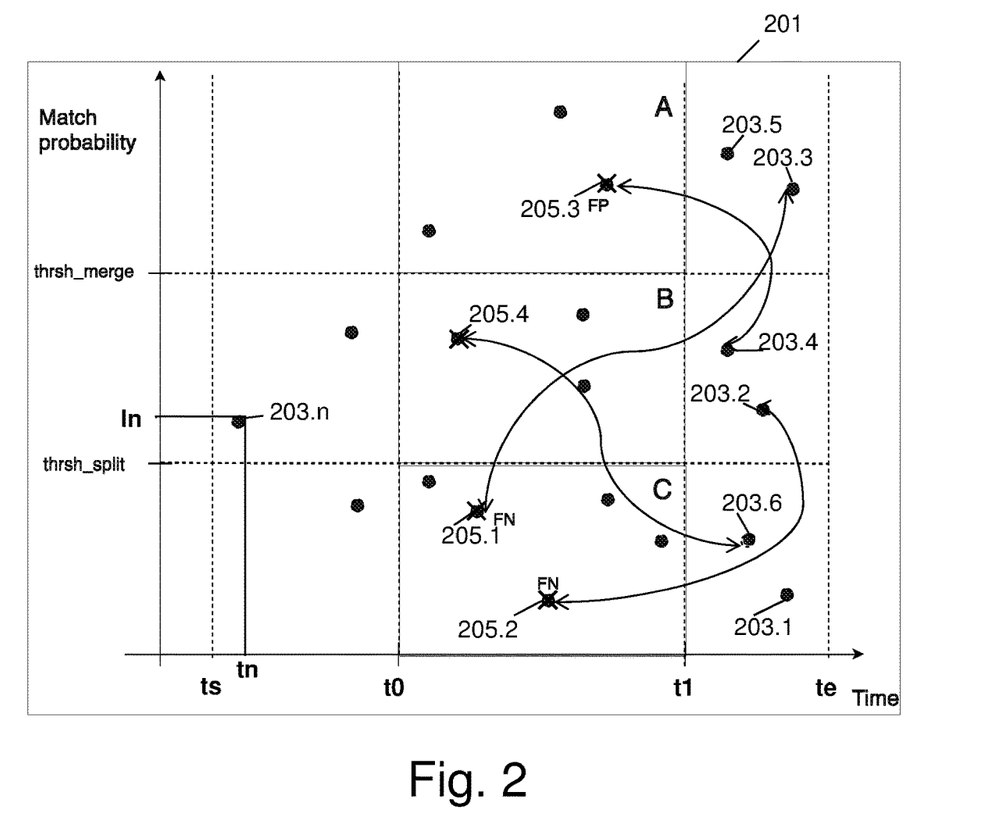
FIG. 2 is a graph indicating false and non-false tasks of user and system tasks that were defined within a predefined time interval.

FIG. 2 is a graph 201 indicating false and non-false tasks of user and system tasks that were defined within a time interval [ts, te] e.g. by the matching component 115. The vertical axis shows the level of matching (or matching probability) of records that is used to define a task as shown by a point in the graph 201. For example, point 203.$n$ indicates a task that has been defined at time to in response to comparing records with a level of matching ln.

Two thresholds thrsh_split and thrsh_merge are provided for determining the matching criterion of the matching component 115. The matching criterion may be defined as follows. If the level of matching of records is within the range [thrsh_split, thrsh_merge], then a user input may be needed for defining a task (user defined task) to be executed for merging or keeping separate the records. If the level of matching is higher than thrsh_merge, a system defined task may be determined (e.g. automatically) to merge compared records. If the level of matching is smaller than thrsh_split, a system defined task may be determined (e.g. automatically) to keep separate compared records. However, the defined tasks may be false or wrong e.g. depending on the comparison algorithm being used etc. A task may be identified as being false if another comparison is performed (e.g.

at a later point of time) on the same records of the task and resulted in a different task, wherein the different task would replace said task.

False tasks are indicated by points overlaid by a cross mark 205.1-205.3 and non-false tasks are indicated by points 203.1-203.*n* (only part of points of non-false tasks is referenced for clarity purpose). The graph further indicates that tasks 203.3, 203.2 and 203.4 replaced the respective false tasks 205.1, 205.2 and 205.3.

For example, false task 205.1 has been defined based on a level of matching smaller than thrsh_split, wherein that level of matching is the result of a first comparison of given records. However, a second comparison on the same given records resulted in another level of matching that is higher than thrsh_merge. The other level of matching has thus been used to define a different task 203.3, which then replaces the task 205.1. Thus, the task 205.1 is a false task. The first comparison may be performed by a first matching algorithm. The second comparison may be performed by a second matching algorithm. The second matching algorithm may be different from the first matching algorithm. For example, the second matching algorithm may be an updated version of the first matching algorithm. The second comparison may be performed at a different or at a same point of time as the first comparison.

In a second example, false task 205.2 has been defined based on a level of matching smaller than thrsh_split, wherein that level of matching is the result of a first comparison of given records. However, a second comparison on the same given records of the second example resulted in another level of matching that is within the range [thrsh_split, thrsh_merge]. The other level of matching has thus been used by a user to define a different task 203.2, which then replaces the task 205.2. Thus, the task 205.2 is a false task. The first comparison of the second example may be performed by a first matching algorithm. The second comparison of the second example may be performed by a second matching algorithm. The second matching algorithm of the second example may be different from the first matching algorithm of the second example. For example, the second matching algorithm of the second example may be an updated version of the first matching algorithm of the second example. The second comparison of the second example may be performed at a different or at a same point of time as the first comparison of the second example.

In a third example, false task 205.3 has been defined based on a level of matching higher than thrsh_merge, wherein that level of matching is the result of a first comparison of given records. However, a second comparison on the same given records of the third example resulted in another level of matching that is within the range [thrsh_split, thrsh_merge]. The other level of matching has thus been used by a user to define a different task 203.4, which then replaces the task 205.3. Thus, the task 205.3 is a false task. The first comparison of the third example may be performed by a first matching algorithm. The second comparison of the third example may be performed by a second matching algorithm. The second matching algorithm of the third example may be different from the first matching algorithm of the third example. For example, the second matching algorithm of the third example may be an updated version of the first matching algorithm of the third example. The second comparison of the third example may be performed at a different or at a same point of time as the first comparison of the third example.

In a fourth example, false task 205.4 has been defined by a user based on a level of matching within the range [thrsh_split, thrsh_merge], wherein that level of matching is the result of a first comparison of given records. That task 205.4 may, for example, be configured for merging the given records. However, a second comparison on the same given records of the fourth example resulted in another level of matching that is smaller than thrsh_split. The other level of matching has thus been used by the system to define (e.g. automatically) a different task 203.6, which then replaces the task 205.4. Thus, the task 205.4 is a false task e.g. because the user may not have looked at the attribute values correctly and decided to merge the given records. The first comparison of the fourth example may be performed by a first matching algorithm. The second comparison of the fourth example may be performed by a second matching algorithm. The second matching algorithm of the fourth example may be different from the first matching algorithm of the fourth example. For example, the second matching algorithm of the fourth example may be an updated version of the first matching algorithm of the fourth example. The second comparison of the fourth example may be performed at a different or at a same point of time as the first comparison of the fourth example.

The false tasks may be tasks defined within a predefined time window [t0, t1] which is a sub-interval of the time interval [ts, te]. Three zones A, B and C are shown in graph 201. Zone A comprises tasks that have been defined within the time window based on level of matching higher than thrsh_merge. Zone B comprises tasks that have been defined within the time window based on level of matching within the range [thrsh_split, thrsh_merge]. Zone C comprises tasks that have been defined within the time window based on level of matching smaller than thrsh_split.

Figure 3:
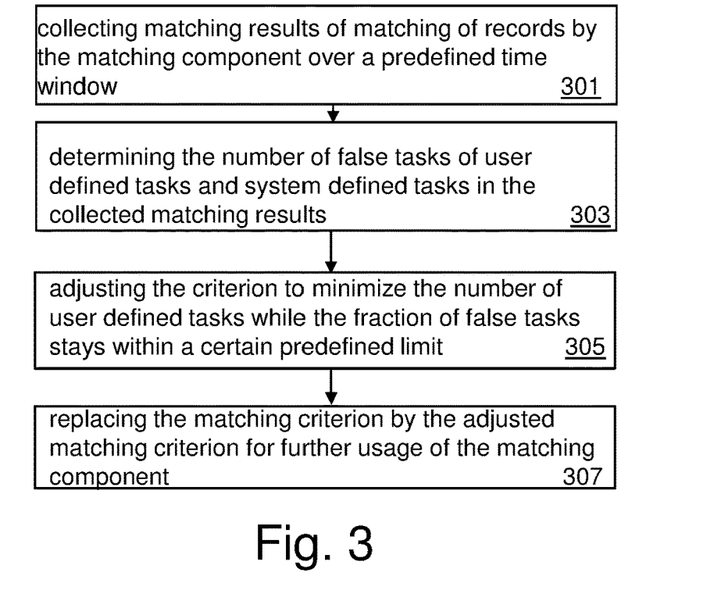
FIG. 3 is a flowchart of a method for enabling data integration in accordance with an example of the present disclosure.

FIG. 3 is a flowchart of a method for enabling data integration in accordance with an example of the present disclosure.

In step 301, matching results may be collected. For example, the matching results of the matching component 115 may be obtained and saved or stored during a predefined time interval such as time interval [ts, te] of graph 201. The matching results may, for example, comprise pairs of (compared records, defined task), wherein each pair indicate the records that are compared and the task that resulted from that comparison. Following the example of FIG. 2, information on each task of the tasks 203.1-*n* and 205.1-3 may be saved in association with information on records that have been matched or compared for the each task. A matching result may be a record having attribute values of attributes such as the type and ID of the task, compared records, the time at which the task is defined, an indication whether the task is a user defined or system defined task, level of matching e.g. PME score, and one or more user defined features etc. The following entries are an example of matching results which were provided by the user or by the system:

| Task | Compared Records | timestamp | System Resolved | PME Total Score | Feature 1 | Feature 2 | ... |
|---|---|---|---|---|---|---|---|
| Merging task 203.5 | Record indices 1233 and 1245 | 20.10.2018 at 13:45 | Y | 17.81 | 3.04 | 4.51 | |
| Merging task | Record indices 1785, 1563, 1455 | 21.10.2018 at 22:45 | N | 15.21 | 2.43 | 4.02 | |

In step 303, the number of false tasks of user defined tasks and system defined tasks in the collected matching results may be determined. For that, a time sub-interval of the time interval e.g. [ts, te], during which the matching results are obtained and collected, may be selected e.g. the time interval [t0, t1] may be selected. The selected time interval e.g. [t0, t1] may be a user defined interval. In another example, the selected time interval may be the result of an automatic random selection.

The number of false tasks in the selected time window may be determined as follows. The entries of the matching results that have time attribute values within the selected time interval are identified (e.g. in the example of FIG. 2, the entries of the all points in zones A, B and C may be identified). For each identified entry, the method may comprise searching in the matching results one or more entries that have the same compared records e.g. entries that have the same values of the attribute "Compared Records". This may result in searched entries that have same compared records as identified entries. If for a given identified entry, another entry has been found having the same compared records, then the task represented by the given identified entry is a false task. The searched entries may be the entries that have the time values younger the selected time interval e.g. following the example of FIG. 2, the searched entries are entries of points of the interval between t1 and te. In other terms, the search may be performed only for entries having a time value younger than the selected time interval.

Following the example of FIG. 2, the number of false tasks in that selected time interval [t0, t1] is four, namely false tasks 205.1-4, because four tasks have been identified in the interval [t1, te] as having same compared records as the four false tasks.

A fraction of false tasks may be computed using the determined number of false tasks. In one example, the fraction of the false tasks may be the ratio of the determined number of false tasks and the total number of tasks in the selected time interval. Following the example of FIG. 2, the fraction of false tasks may be 4/11=0.36.

In another example, the fraction of false tasks may be the ratio of a weighted sum of the determined number of false tasks and the total number of user defined tasks and system defined tasks within the selected time interval, wherein the weighted sum uses a first weight for a respective false user defined task and a different second weight for false system defined tasks. In one example, a single first weight UW may be assigned to the false user defined tasks and a second weight SW may be assigned to false system defined tasks. In one example, UW may be different from SW. In another example, the first weight may be user dependent UW(u). For example, UW(u) may be provided depending on the user u that defined the false task. In another example, if the matching criterion used by the matching component is the one used for FIG. 2, the weight SW may be provided depending on the system defined tasks are being of zone A or zone C e.g. SWa may be provided for tasks of zone A and SWc may be provided for tasks for zone C.

In step 305, the matching criterion e.g. of the matching component 115 may be adjusted to minimize the number of user defined tasks while the fraction of false tasks stays within a certain predefined limit. An example of adjusting the matching criterion is described with reference to FIG. 4. The predefined limit may, for example, be one of [0, 0.001], [0, 0.01], [0, 0.1], [0, 0.0001] and [0, 0.00001]. That is, the fraction of false tasks should stay smaller than delta=0.001, 0.01, 0.1 or 0.00001 for the method to be repeated.

In step 307, the matching criterion may be preplaced by the adjusted matching criterion for further usage of the matching component 115. In this way, the matching component 115 may be configured to match the received records and define the tasks based on the adjusted matching criterion.

Figure 4:
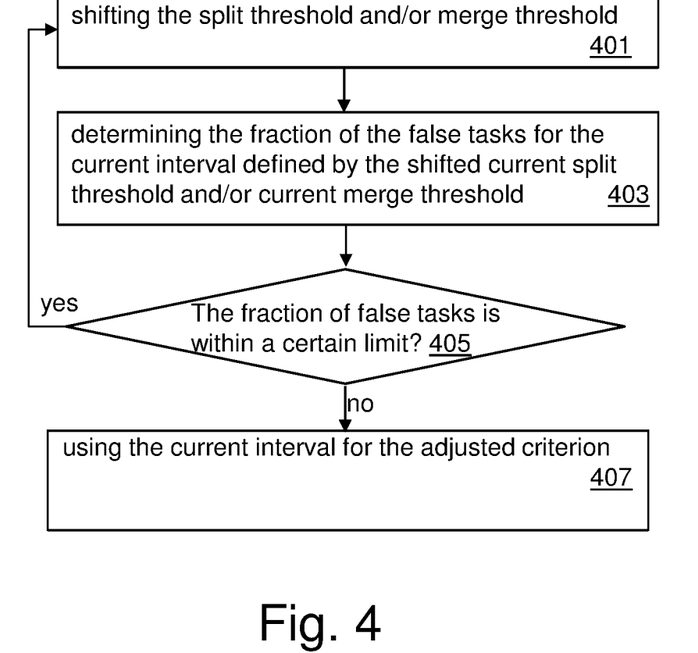
FIG. 4 is a flowchart of a method for adjusting the matching criterion of the matching component.

FIG. 4 is a flowchart of a method for adjusting the matching criterion of the matching component 115. The matching criterion may, for example, be the one defined in FIG. 2 using the range [thrsh_split, thrsh_merge]. That range may be referred to as the initial range [thrsh_split0, thrsh_merge0].

In step 401, the split threshold thrsh_split0 and/or merge threshold thrsh_merge0 may be shifted such that a current interval formed by the shifted split and/or shifted merge matching thresholds becomes smaller than the range [thrsh_split0, thrsh_merge0]. This step may, for example, result in a current range [thrsh_split1, thrsh_merge0], [thrsh_split0, thrsh_merge1], or [thrsh_split1, thrsh_merge1], where thrsh_split1 is higher than thrsh_split0 and thrsh_merge1 is smaller than thrsh_merge0. The shifting may, for example, be performed by a predefined shift amount. The predefined shift amount may be user defined e.g. shifting a threshold by 10% etc. Step 401, the matching criterion as described with reference to FIG. 2 when applied on the current range becomes an adjusted matching criterion of the matching criterion that is applied on the initial range.

In step 403, the fraction of the false tasks may be determined for the adjusted matching criterion e.g. defined by thrsh_split1 and thrsh_merge1. The determination of the fraction of the false tasks may be performed for the selected time window [t0, t1] as described with reference to FIG. 3.

In case (inquiry step 405) the fraction of the false tasks is within the certain predefined limit, the shifting and the determining steps 401 and 403 may be repeated; otherwise the current range may be used for the adjusted criterion in step 407. In one example, the predefined limit may dynamically be determined by the sum of the immediately preceding fraction of false tasks and delta. For example, if the current iteration is the $i^{th}$ iteration, the predefined limit may be defined as [0, $E_{i-1}$+delta], where $E_{i-1}$ is the fraction of the false tasks defined in the iteration i−1. An example implementation of steps 403 and 405 may be performed using the following pseudo code algorithm, where the error rate is the fraction of the false tasks.

```
Find_thresholds(i, j, delta):
    Initialization:
    Let N0 denote the number of user defined tasks for thresholds i, j;
    Calculate error rate E0 for thresholds i, j;
    Assign current thresholds i, j to be the optimal: i_opt = i, j_opt = j.
Repeat steps:
    adjust thresholds to i1, j1
    calculate N1 (number of user defined tasks)
    calculate error rate E1
    If error rate increases less than admissible deviation (E1 - E0 < delta)
        and the number of user defined tasks decreased (N1 < N0),
        then adjust optimal thresholds:
        i_opt = i1, j_opt = j1;
return (i_opt, j_opt).
```

Provided that there is a finite number of clerical tasks or user defined tasks, that is the subject to minimize, the algorithm may eventually terminate after the number of iterations, proportional to N0 (initial number of clerical tasks). As a result of the algorithm execution the pair of thresholds (i_opt, j_opt) was found, that is optimal for the time period being analyzed, such that any other thresholds values could not reduce the number of clerical tasks without the increase of the error rate more, than admissible deviation delta. If optimal thresholds differ from the initial ones, then the new values may be used for subsequent (in time) task resolutions. The described procedure of adjusting thresholds may be repeated on the regular (scheduled) basis for the tasks, that currently get in actual time-window under consideration. For example, steps 401-405 may be repeated on a periodic basis for different time windows e.g. for time windows subsequent to time window [t0, t1].

Figure 5:
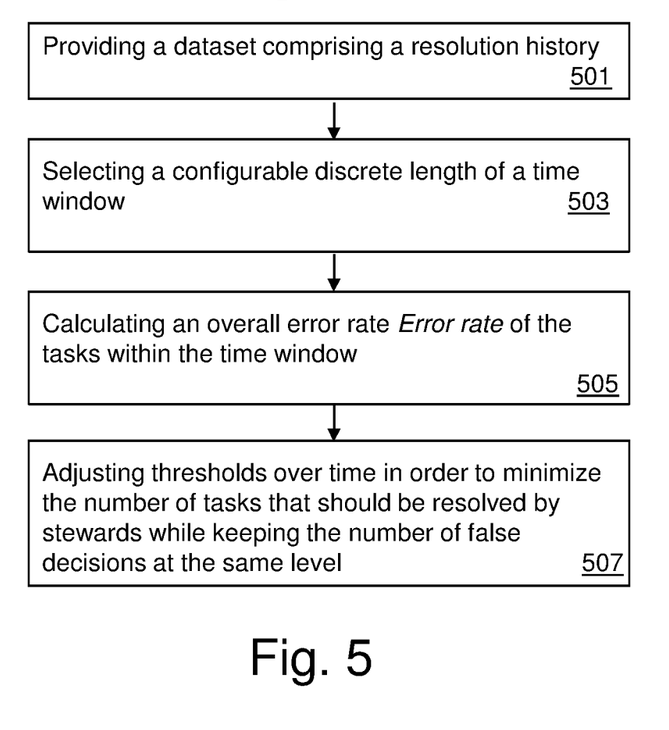
FIG. 5 is a flowchart of a method for matching records in accordance with the present disclosure.

FIG. 5 is a flowchart of a method for matching records in accordance with an example of the present disclosure.

In step 501, a dataset may be provided. The dataset may, for example, be an available dataset of the resolution history. The dataset may consist of the performed user defined tasks (e.g. tasks based on a clerical review) and system defined tasks (e.g. tasks determined automatically) resulting from a matching or comparison between records. A task may be a record merging task for merging the compared records or a split task for keeping the compared records separate based on the comparison result. In order to determine a task, the level of matching between the compared records may, for example, be compared with a split threshold thrsh_split and merge threshold thrsh_merge. For example, if the level of matching is within the interval [thrsh_split, thrsh_merge], the tasks may be user defined tasks because a clerical review may be needed for that level of matching. If the level of matching is outside the interval [thrsh_split, thrsh_merge], the tasks may be system defined tasks e.g. the system can automatically define one of the record merging task and split task as a resolution for the matching of records. All the tasks with a score higher than thrsh_merge value should be merged automatically. Correspondingly, tasks with a score lower than thrsh_split should be split (non-merge resolution). Consequently, tasks with score between the chosen thresholds should be resolved by stewards.

For example, each task of the dataset may be characterized or associated with the following properties. A first property may be a resolution timestamp indicating the time at which the task is executed. A second property comprises a matching score or level of matching that indicates a probability for the task to be a record merging task. The matching score may, for example, be a ML confidence score, in case the matching of records is performed using machine learning. A third property may indicate the difference between the task and the correct decision or correct task to be executed for the compared records. For example, if the task is a false record merging task, it represents a false positive—FP, and if the task is a false split task tasks the task is a false negative—FN. A fourth property may comprise an ID of the steward responsible for the task. Besides, for each steward the timestamp is known, when particular user started to work with the system. For example, system defined tasks of zone A may contain false positives. System defined split tasks of zone C may contain false negatives.

In step 503, a configurable discrete length of a time window, for which the analysis of the dataset is performed, may be selected. An example time window is shown in FIG. 3. In graph 201, tasks are shown as the points over the time. The time window ranges between the points of time t0 and t1. Only the tasks performed within these time window, are taken for the analysis. Those tasks are shown as points in zones A, B, C on the graph 201.

In step 505, an overall error rate Error rate of the tasks within the time window may be calculated. This may be done by evaluating the contribution of the false tasks differently for system defined tasks (e.g. auto-resolved tasks) and for those completed by stewards (user defined tasks). System defined tasks may have an equal contribution to the error rate by summing their numbers. In another example, system defined tasks of zone A may have an equal contribution (A-contribution) to the error rate and system defined tasks of zone C may have an equal contribution (C-contribution) to the error rate, wherein A-contribution is different from C-contribution. For the clerical decisions or user defined tasks, an additional logic that should consider steward-specific metrics may be added. The steward specific metric may be the user metric defined herein.

The error rate may then be defined as follows: Error rate=1/N*Sum of Ci over false tasks, where N is the number of total tasks within the time window. Ci represents the coefficient that aligns a contribution of false task i, considering different contributions. For example, it could be C=1 for system defined tasks, C<1 or C>1 for the user defined tasks, depending whether it is required to minimize or emphasize the effect of the particular false outcome.

Given this initial setup that enables the calculation of the error rate, the method may further be configured to adjust thresholds over time in order to minimize the number of tasks that should be resolved by stewards while keeping the number of false decisions at the same level. For example, in step 507, thresholds thrsh_split and thrsh_merge may be shifted to minimize the number of tasks, resolved by stewards (the number of points in zone B in graph 201 may be minimized) while keeping the number of false decisions at the same level as described with reference to FIG. 4. The subject to constrain in such optimization problem is the increase of the error rate, calculated after shifting thresholds values. To state more formally, we select the admissible deviation delta=0.01 (or other reasonably small value), that indicates the maximum allowable increase of the error rate after adjusting thresholds.

Figure 6:
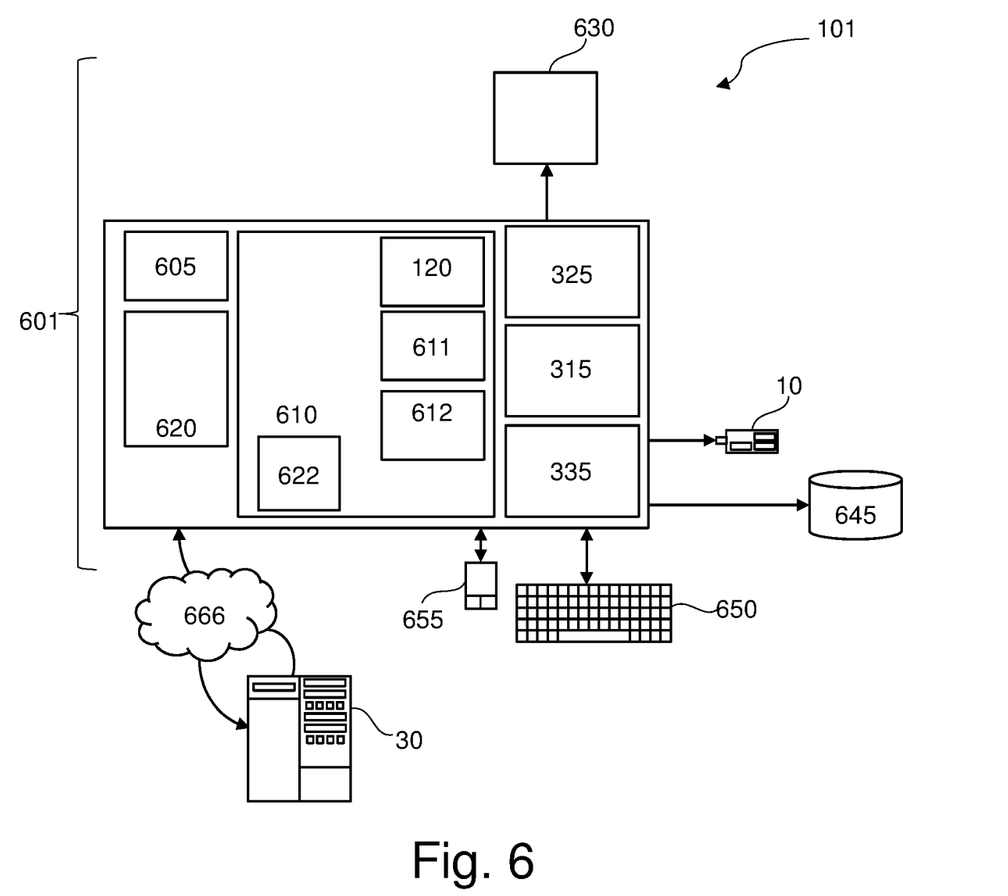
FIG. 6 represents a computerized system, suited for implementing one or more method steps as involved in the present disclosure.

FIG. 6 depicts an example hardware implementation of data integration system 101. FIG. 6 represents a general computerized system, suited for implementing method steps as involved in the present disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software, 622 (including firmware 622), hardware (processor) 605, or a combination thereof. In exemplary embodiments, the methods described herein are implemented in software, as an executable program, and is executed by a special or general-purpose digital computer, such as a personal computer, workstation, minicomputer, or mainframe computer. The most general system 101 therefore includes a general-purpose computer 601.

In exemplary embodiments, in terms of hardware architecture, as shown in FIG. 6, the computer 601 includes a processor 605, memory (main memory) 610 coupled to a memory controller 615, and one or more input and/or output (I/O) devices (or peripherals) 10, and 645 that are communicatively coupled via a local input/output controller 635. The input/output controller 635 can be, but is not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 645 may generally include any generalized cryptographic card or smart card known in the art.

The processor 605 is a hardware device for executing software, particularly that stored in memory 610. The processor 605 can be any custom made or commercially available processor, a central processing unit (CPU), an auxiliary processor among several processors associated with the computer 601, a semiconductor based microprocessor (in the form of a microchip or chip set), a macroprocessor, or generally any device for executing software instructions.

The memory 610 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 610 can have a distributed architecture, where various components are situated remote from one another, but can be accessed by the processor 605.

The software in memory 610 may include one or more separate programs, each of which comprises an ordered listing of executable instructions for implementing logical functions, notably functions involved in embodiments of this invention.

The software in memory 610 shall also typically include a suitable operating system (OS) 611. The OS 611 essentially controls the execution of other computer programs, such as the algorithm 120. The algorithm 120 may, for example, comprise a database management system or a Java application. The algorithm 120 may comprise components for performing at least part of the present method. The algorithm 120 may further comprise a component for performing standardization of data records e.g. before performing the matching. The standardization refers to a process of transforming data to a predefined data format. The data format may include a common data definition, format, representation and structure. The data that is to be transformed is the data that is not conform to the predefined data format. For example, the process of transforming the data may comprise processing the data to automatically transform the data where necessary to comply with those common representations that define the data format. This process of transforming data may include identifying and correcting invalid values, standardizing spelling formats and abbreviations, and validating the format and content of the data.

The methods described herein may be in the form of a source program, executable program (object code), script, or any other entity comprising a set of instructions to be performed. When a source program, then the program needs to be translated via a compiler, assembler, interpreter, or the like, which may or may not be included within the memory 610, so as to operate properly in connection with the OS 611. Furthermore, the methods can be written as an object oriented programming language, which has classes of data and methods, or a procedure programming language, which has routines, subroutines, and/or functions.

In exemplary embodiments, a conventional keyboard 650 and mouse 655 can be coupled to the input/output controller 635. Other output devices such as the I/O devices 645 may include input devices, for example but not limited to a printer, a scanner, microphone, and the like. Finally, the I/O devices 10, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 645 can be any generalized cryptographic card or smart card known in the art. The system 101 can further include a display controller 625 coupled to a display 630. In exemplary embodiments, the system 101 can further include a network interface for coupling to a network 666. The network 666 can be an IP-based network for communication between the computer 601 and any external server, client and the like via a broadband connection. The network 666 transmits and receives data between the computer 601 and external systems 30, which can be involved to perform part or all of the steps of the methods discussed herein. In exemplary embodiments, network 666 can be a managed IP network administered by a service provider. The network 666 may be implemented in a wireless fashion, e.g., using wireless protocols and technologies, such as WiFi, WiMax, etc. The network 666 can also be a packet-switched network such as a local area network, wide area network, metropolitan area network, Internet network, or other similar type of network environment. The network 666 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 601 is a PC, workstation, intelligent device or the like, the software in the memory 610 may further include a basic input output system (BIOS) 612. The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the processor 605 is configured to execute software stored within the memory 610, to communicate data to and from the memory 610, and to generally control operations of the computer 601 pursuant to the software. The methods described herein and the OS

611, in whole or in part, but typically the latter, are read by the processor 605, possibly buffered within the processor 605, and then executed.

When the systems and methods described herein are implemented in software, as is shown in FIG. 6, the methods can be stored on any computer readable medium, such as storage 620, for use by or in connection with any computer related system or method. The storage 620 may comprise a disk storage such as HDD storage.

Figure 7:
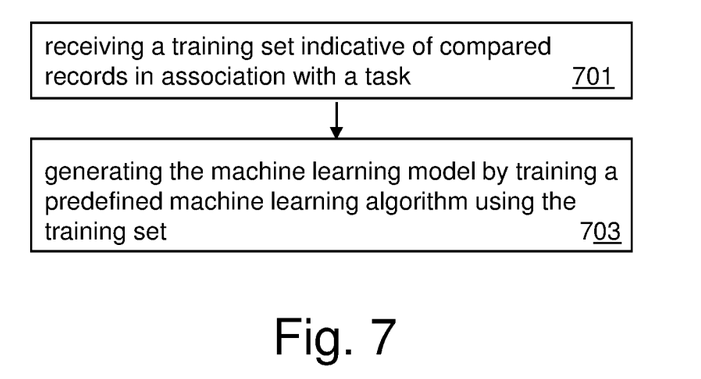
FIG. 7 is a flowchart of a method for generating a machine learning model in accordance with the present disclosure.

FIG. 7 is a flowchart of a method for generating a machine learning model in accordance with the present disclosure.

In step 701, a training set may be received e.g. by the data integration system 101. The training set is indicative of previously compared records in association with a data indicating the task executed for that compared record, wherein the execution of the task results in the compared records being merged or kept separate.

For example, the training set for training the machine learning algorithm may be obtained from at least two sources. For example, the training set is retrieved from a task resolution history such as central repository 103. This resolution history includes matching decisions (e.g. merging or not merging decisions) that stewards have taken in the past. For example, the training set includes a decision of the data steward as well as the attributes of the two records that were compared, wherein the decision is indicative of the fact that the two compared records are matching records or not matching records.

If no task resolution history exists, the training set may be built using similar matching tasks determined by an unsupervised machine learning algorithm. For example, the data steward may provide or define one user defined task for a given pair of compared records. The given pair of records may be used to identify similar pairs of records which are not yet compared based on attribute values of the given pair of records. These identified pairs of records may be associated with that a data indicative of that one user defined task and stored in the training set. This active learning may improve the quality of predictions.

In step 703, a machine learning model may be generated by training a predefined machine learning algorithm using the training set. The machine learning model may be configured to predict if input records to be compared are mergeable records or not. The machine learning algorithm may, for example, be a decision tree algorithm, random forest algorithm or a neural network.

Various embodiments are specified in the following numbered clauses:

1. A method for enabling data integration, the method comprising:
    providing a matching component for matching data records with a matching criterion, the matching component being configured for comparing data records and providing a level of matching between the compared data records, the matching component being configured in case the level of matching fulfils the matching criterion as a matching result to prompt a user for a user defined task for processing the data records and otherwise as a matching result to provide a system defined task for processing the data records, the processing comprising merging or keeping separate the compared records;
    collecting matching results of matching of records by the matching component over a time window;
    determining the number of false tasks of user defined tasks and system defined tasks in the collected matching results, a false task being a user or system defined task that is replaced by a user or system defined task;
    adjusting the criterion to minimize the number of user defined tasks while the fraction of false tasks stays within a certain limit; and
    replacing the matching criterion by the adjusted matching criterion for further usage of the matching component.

2. The method of clause 1, the fraction of the false tasks being the ratio of a weighted sum of the number of false tasks and the total number of user defined tasks and system defined tasks within the time window, wherein the weighted sum uses a first weight for a respective false user defined task and a different second weight for false system defined tasks.

3. The method of clause 2, wherein the first weight is determined per false user defined task using a user metric.

4. The method of clause 3, wherein the user metric indicates at least one of:
    the number of users defined a false user defined task;
    the number of user defined tasks in a time period, the tasks being defined by a user who defined a false user defined task in the time window;
    the number of correct user defined tasks in a time period, the tasks being defined by a user who defined a false user defined false task in the time window.

5. The method of any of the previous clauses 2-4, wherein the second weight is equal to 1, and the first weight is smaller or higher than 1.

6. The method of any of the previous clauses, further comprising providing a split matching threshold and merge matching threshold, wherein the criterion requires that the level of matching is between the split and merge matching thresholds, wherein the adjusting comprises shifting the split and/or merge matching thresholds.

7. The method of clause 6, the adjusting of the criterion comprises:
    shifting the split and/or merge matching threshold such that a current interval formed by the shifted split and merge matching thresholds becomes smaller than a previous interval; and
    determining the fraction of the false tasks for the current interval;
    if the fraction of the false tasks is within the certain limit, repeating the shifting and the determining; otherwise using the current interval for the adjusted criterion.

8. The method of clause 6 or 7, wherein the certain limit is any one of the following intervals [0, 0.001], [0, 0.01], [0, 0.1], [0, 0.0001] and [0, 0.00001].

9. The method of any of the previous clauses, wherein the false system and user defined tasks comprise false positive tasks and false negative tasks, wherein the false positive task is a task for merging the compared records, wherein the false negative task is a task for keeping separate the compared records.

10. The method of any of the previous clauses, wherein the matching component is configured to use a probabilistic matching method for providing the level of matching.

11. The method of any of the previous clauses 1-9, wherein the matching component is configured for inputting the records to a predefined machine learning model; and receiving from the machine learning model an output indicative of the level of matching.

12. The method of clause 11, further comprising:
    receiving a training set indicative of compared records in association with a task indicative of whether the compared records are to be merged or not;

training a predefined machine learning algorithm using the training set, thereby generating the machine learning model to predict if compared records are mergeable records.

13. The method of clause 12, further comprising generating the training set comprising collecting data from at least one data source, and extracting from the collected data the compared records and associated tasks, wherein the data source comprises a data integration system and/or one or more other data integration systems.

14. The method of clause 12 or 13, further comprising generating the training set comprising receiving a first set of one or more compared pairs of records and associated tasks; providing multiple non-compared pairs of records that are similar to the first set pairs of records; using the first and non-compared set of records as the training set.

15. The method of clause 14, wherein the multiple non-compared pairs of records are determined using a machine learning unsupervised algorithm based model.

16. The method of any of the previous clauses 11-15, wherein the output is a confidence score of the prediction by the machine learning model.

17. The method of any of the previous clauses, further comprising: using the processed records for performing the master data management and/or the data warehousing.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method comprising:
comparing data records according to a matching criterion using a matching component to provide a level of matching between records that have been compared;
in response to the level of matching between the compared records fulfills the matching criterion, prompting a user for a user defined task for processing data, wherein processing the data comprises merging or keeping the compared records separate;
collecting matching results of the compared records, by the matching component, over a time window;
determining a ratio for a number of false tasks of user defined tasks and system defined tasks in the collected matching results;
improving the matching criterion by adjusting the matching criterion to minimize the number of user defined tasks while a fraction of false tasks stays within a certain limit based on a split matching threshold and a merge matching threshold, wherein adjusting the matching criterion comprises shifting at least one of the split threshold and the merge matching thresholds such that a current interval formed by at least one of the shifted split threshold and the shifted merge matching thresholds becomes lesser than a previous interval;
replacing the matching criterion by the adjusted matching criterion for further usage of the matching component; and
reducing clerical errors associated with the compared records by creating a golden record as a replacement for records that have been found to be duplicates and instructing future updates be executed against the created golden record.

2. The computer-implemented method of claim 1, wherein the fraction of the false tasks is a ratio of a weighted sum of the number of false tasks and a total number of user defined tasks and total number of system defined tasks within the time window, and wherein the weighted sum uses a first weight for a respective false user defined task and a different second weight for false system defined tasks.

3. The computer-implemented method of claim 2, wherein the first weight is determined as a false user defined task based on a user metric.

4. The computer-implemented method of claim 3, wherein the user metric indicates at least one of:
the number of users defined the respective false user defined task;
the number of user defined tasks in a time period, wherein the user defined tasks are defined by a user that specified a false user defined task in the time window; and
a number of correct user defined tasks in a time period and a number of the user defined tasks are defined by a user that specified a false user defined task in the time window.

5. The computer-implemented method of claim 3, wherein the second weight is equal to 1, and the first weight is either less than or greater than 1.

6. The computer-implemented method of claim 1, further comprising:
providing the split matching threshold and the merge matching threshold, wherein the matching criterion requires a level of matching that is between the split matching threshold and the merge matching threshold.

7. The computer-implemented method of claim 6, wherein the adjusting of the criterion comprises:
determining the fraction of the false tasks for the current interval; and
if the fraction of the false tasks is within the certain limit, repeating the shifting and the determining; otherwise using the current interval for the adjusted criterion.

8. The computer-implemented method of claim 7, wherein the certain limit is selecting from the group consisting of intervals: [0, 0.001], [0, 0.01], [0, 0.1], [0, 0.0001] or [0, 0.00001].

9. The computer-implemented method of claim 1, wherein the false system and user defined tasks comprise false positive tasks and false negative tasks, wherein the false positive task is a task for merging the compared records, wherein the false negative task is a task for keeping separate the compared records.

10. The computer-implemented method of claim 1, wherein the matching component is configured to use a probabilistic matching method for providing the level of matching.

11. The computer-implemented method of claim 1, wherein the matching component is configured for:
inputting the records to a predefined machine learning model; and
receiving, from the machine learning model, an output indicative of the level of matching.

12. The computer-implemented method of claim 11, further comprising:
receiving a training set indicative of compared records in association with a task indicative of whether the compared records are to be merged or not;
training a predefined machine learning algorithm using data contained in the training set, thereby generating the machine learning model to predict if the compared records are mergeable records; and
predicting that the compared records are mergeable records.

13. The computer-implemented method of claim 11, further comprising:
generating a training set comprising receiving a first set of one or more compared pairs of records and associated tasks; and
providing multiple non-compared pairs of records that are within a degree of similarity to the first set pairs of records based on results obtained from the training set comprising the first and non compared set of records.

14. The computer-implemented method of claim 13, wherein a machine learning unsupervised algorithm based model determines the multiple non-compared pairs of records.

15. The computer-implemented method of claim 11, wherein the output is a confidence score of a prediction by the machine learning model.

16. The computer-implemented method of claim 1, further comprising:
generating a training set comprising collected data from at least one data source; and
extracting from the collected data, the compared records and associated tasks, wherein the data source comprises at least one of a data integration system and one or more other data integration systems.

17. The computer-implemented method of claim 1, further comprising:
storing the processed records for performing at least one of a master data management and data warehousing.

18. A computer program product comprising:
one or more computer readable storage media and program instructions stored on the one or more computer readable storage media, the stored program instructions comprising:
program instructions to compare data records according to a matching criterion using a matching component to provide a level of matching between records that have been compared;
program instructions to, in response to the level of matching between the compared records fulfills the matching criterion, prompt a user for a user defined task for processing data, wherein the program instructions to process the data comprise program instructions to merge or keep the compared records separate;
program instructions to collect matching results of the compared records, by the matching component, over a time window;
program instructions to determine a ratio for a number of false tasks of user defined tasks and system defined tasks in the collected matching results;
program instructions to improve the matching criterion by adjusting the matching criterion to minimize the number of user defined tasks while a fraction of false tasks stays within a certain limit based on a split matching threshold and a merge matching threshold, wherein adjusting the matching criterion comprises shifting at least one of the split threshold and the merge matching thresholds such that a current interval formed by at least one of the shifted split threshold and the shifted merge matching thresholds becomes lesser than a previous interval;
program instructions to replace the matching criterion by the adjusted matching criterion for further usage of the matching component; and
program instructions to perform master data management for the compared records using the adjusted matching criterion and a created golden record as a replacement for records that have been found to be duplicates.

19. A computer system comprising:
one or more computer processors;
one or more computer readable storage media; and
program instructions stored on the computer readable storage media for execution by at least one of the one or more processors, the stored program instructions comprising:
program instructions to compare data records according to a matching criterion using a matching component to provide a level of matching between records that have been compared;
program instructions to, in response to the level of matching between the compared records fulfills the matching criterion, prompt a user for a user defined task for processing data, wherein the program instructions to process the data comprise program instructions to merge or keep the compared records separate;
program instructions to collect matching results of the compared records, by the matching component, over a time window;
program instructions to determine a ratio for a number of false tasks of user defined tasks and system defined tasks in the collected matching results;
program instructions to improve the matching criterion by adjusting the matching criterion to minimize the number of user defined tasks while a fraction of false tasks stays within a certain limit based on a split matching threshold and a merge matching threshold, wherein adjusting the matching criterion comprises shifting at least one of the split threshold and the merge matching thresholds such that a current interval formed by at least one of the shifted split threshold and the shifted merge matching thresholds becomes lesser than a previous interval;
program instructions to replace the matching criterion by the adjusted matching criterion for further usage of the matching component; and
program instructions to perform master data management for the compared records using the adjusted matching criterion and a created golden record as a replacement for records that have been found to be duplicates.

\* \* \* \* \*